United States Patent [19]

Epstein et al.

[11] Patent Number: 5,093,439
[45] Date of Patent: Mar. 3, 1992

[54] PROCESSES FOR PREPARATION OF SULFONATED POLYANILINE COMPOSITIONS AND USES THEREOF

[75] Inventors: Arthur J. Epstein, Bexley; Jiang Yue, Columbus, both of Ohio

[73] Assignee: Ohio State University Research Foundation, Columbus, Ohio

[21] Appl. No.: 529,012

[22] Filed: May 25, 1990

Related U.S. Application Data

[63] Continuation-in-part of Ser. No. 423,902, Oct. 19, 1989, which is a continuation-in-part of Ser. No. 193,964, May 13, 1988.

[51] Int. Cl.$^5$ .................. C08L 79/02; C08L 81/00; C08F 283/00
[52] U.S. Cl. .................. 525/540; 525/534; 525/535; 528/210; 528/391; 528/422; 528/487; 252/500; 252/518; 524/422; 524/429; 524/438; 428/364; 428/402; 428/524; 428/526
[58] Field of Search ............ 528/210, 422, 487, 391; 525/540, 534, 535; 252/500, 518; 524/422, 429, 438; 428/364, 402, 524, 526

[56] References Cited

U.S. PATENT DOCUMENTS

| | | | |
|---|---|---|---|
| 3,941,810 | 3/1976 | Koebner | 549/66 |
| 4,488,943 | 12/1984 | Skotheim | 204/58.5 |
| 4,556,623 | 12/1985 | Tamura et al. | 430/83 |
| 4,585,581 | 4/1986 | Skotheim | 252/518 |
| 4,586,792 | 5/1986 | Yang et al. | 350/357 |
| 4,604,427 | 8/1986 | Roberts et al. | 525/185 |
| 4,615,829 | 10/1986 | Tamura et al. | 252/500 |
| 4,636,430 | 1/1987 | Moehwald | 428/304.400 |
| 4,742,867 | 5/1988 | Walsh | 165/96 |
| 4,749,260 | 6/1988 | Yang et al. | 350/357 |
| 4,822,638 | 4/1989 | Yaniger | 427/79 |
| 4,851,487 | 7/1989 | Yaniger et al. | 525/540 |
| 4,855,361 | 8/1989 | Yaniger | 525/436 |
| 4,935,164 | 6/1990 | Wessling et al. | 252/500 |
| 4,973,391 | 11/1990 | Madou et al. | 204/78 |

FOREIGN PATENT DOCUMENTS 61-197633 9/1986 Japan.

OTHER PUBLICATIONS

Paul et al., J. Phys. Chem. 89:1441-1447 (1985).
Stafstrom et al., Phys. Rev. Lett. 59:1464 (1987).
Rice et al., Phys. Rev. Lett., 49:1455 (1982).
Bredas et al., Phys. Rev., B29:6761 (1984).
Chiang et al., Synth. Met. 13:193 (1986).
Ginder et al., Solid State Commun., 63:97 (1987).
Epstein et al., Synth. Met., 18:303 (1987).
Choi et al., Phys. Rev. Met., 59:2188 (1987).
Skotheim et al., Electrochem. Soc., 132:246 (1985).
Obayashi et al., Adv. Chem. Ser., 163;316 (1977).
Sammels et al., J. Electrochem. Soc., 131:617 (1984).
Chao et al., J. Am. Chem. Soc., 109:6627 (1987).
Hardy et al., J. Am. Chem. Soc., 1071:3823 (1985).
Gregory et al., Synthetic Metals, 28:C823-C835 (1989).
Nakajima et al., Synthetic Metals, 28:C629-C638 (1989).
Mizumoto et al., Synthetic Metals, 28:C639-C646 (1989).
Angelopoulos et al., J. Vac. Sci. Technol. B7 (6) Nov./Dec. 1989.
Lacroix et al., J. Electrochem. Soc., 136:1308-1313 (1989).
Computer Search Performed in the 1989 Am. Chem. Soc., (1989).
Chem. Abstracts, 106:33982g (1987).
WPI Data Base Search of JP Patent No. 61-197633.
Noshay et al., J. App. Polymer Sci., 20:1885-1903 (1976).

Primary Examiner—John Kight, III
Assistant Examiner—P. Hampton-Hightower
Attorney, Agent, or Firm—Emch, Schaffer, Schaub & Porcello Co.

[57] ABSTRACT

Sulfonic acid-substituted polyaniline compositions and their derivatives are produced by reacting a polyaniline polymer with $SO_3$ gas. The sulfonated polyaniline compositions have faster electronic and optical responses to electrochemical potentials and improved environmental stability solubility than the parent polyaniline polymer.

12 Claims, 2 Drawing Sheets

PROCESSES FOR PREPARATION OF SULFONATED POLYANILINE COMPOSITIONS AND USES THEREOF

The present invention is a continuation-in-part of co-pending application Ser. No. 07/423,902 filed Oct. 19, 1989 which is a continuation-in-part of co-pending application Ser. No. 193,964 filed May 13, 1988.

BACKGROUND OF THE INVENTION

The present invention relates to processes for the preparation of self-protonated sulfonic acid-substituted polyaniline compositions and their derivatives and uses thereof.

Polyaniline is a family of polymers that has been under intensive study recently because the electronic and optical properties of the polymers can be modified through variations of either the number of protons, the number of electrons, or both. The polyaniline polymer can occur in several general forms including the so-called reduced form (leucoemeraldine base), possesing the general formula

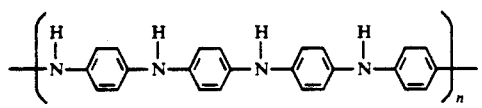

the partially oxidized so-called emeraldine base form, of the general formula

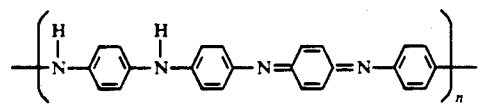

and the fully oxidized so-called pernigraniline form, of the general formula

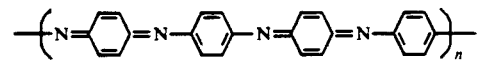

In practice, polyaniline generally exists as a mixture of the several forms with a general formula (I) of

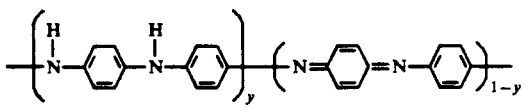

When $0 \leq y \leq 1$, the polyaniline polymers are referred to as poly(paraphenyleneamineimines) in which the oxidation state of the polymer continuously increases with decreasing value of y. The fully reduced poly(paraphenyleneamine) is referred to as leucoemeraldine, having the repeating units indicated above corresponding to a value of $y=1$. The fully oxidized poly(paraphenyleneimine) is referred to as pernigraniline, of repeat unit shown above corresponds to a value of $y=0$. The partly oxidized poly(paraphenyleneimine) with y in the range of greater than or equal to 0.35 and less than or equal to 0.65 is termed emeraldine, though the name emeraldine is often focused on y equal to or approximately 0.5 composition. Thus, the terms "leucoemeraldine", "emeraldine" and "pernigraniline" refer to different oxidation states of polyaniline. Each oxidation state can exist in the form of its base or in its protonated form (salt) by treatment of the base with an acid.

The use of the terms "protonated" and "partially protonated" herein includes, but is not limited to, the addition of hydrogen ions to the polymer by, for example, a protonic acid, such as mineral and/or organic acids. The use of the terms "protonated" and "partially protonated" herein also includes pseudoprotonation, wherein there is introduced into the polymer a cation such as, but not limited to, a metal ion, $M^+$. For example, "50%" protonation of emeraldine leads formally to a composition of the formula

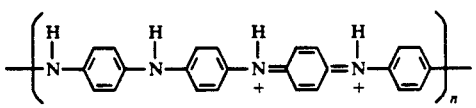

which may be rewritten as

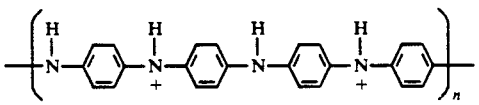

Formally, the degree of protonation may vary from a ratio of $[H^+]/[-N=]=0$ to a ratio of $[H^+]/[-N=]=1$. Protonation or partial protonation at the amine (—NH—) sites may also occur.

The electrical and optical properties of the polyaniline polymers vary with the different oxidation states and the different forms. For example, the leucoemeraldine base, emeraldine base and pernigraniline base forms of the polymer are electrically insulating while the emeraldine salt (protonated) form of the polymer is conductive. Protonation of emeraldine base by aqueous HCl (1M HCl) to produce the corresponding salt brings about an increase in electrical conductivity of approximately $10^{12}$; deprotonation occurs reversibly in aqueous base or upon exposure to vapor of, for example, ammonia. The emeraldine salt form can also be achieved by electrochemical oxidation of the leucoemeraldine base polymer or electrochemical reduction of the pernigraniline base polymer in the presence of an electrolyte of the appropriate pH. The rate of the electrochemical reversibility is very rapid; solid polyaniline can be switched between conducting, protonated and nonconducting states at a rate of approximately $10^5$ Hz for electrolytes in solution and even faster with solid electrolytes. (E. Paul, et al., *J. Phys. Chem.* 1985, 89, 1441–1447). The rate of electrochemical reversibility is also controlled by the thickness of the film, thin films exhibiting a faster rate than thick films. Polyaniline can then be switched from insulating to conducting form as a function of protonation level (controlled by ion insertion) and oxidation state (controlled by electrochemical potential). Thus, in contrast to, for example polypyrrole, polyaniline can be turned "on" by either a negative or a positive shift of the electrochemical potential, because polyaniline films are essentially insulating at sufficiently negative (approximately 0.00 V vs. SCE) or positive (+0.7 V vs. SCE) electrochemical potentials. Polyaniline can also then be turned "off" by an opposite shift of the electrochemical potential.

The conductivity of polyaniline is known to span 12 orders of magnitude and to be sensitive to pH and other chemical parameters. It is well-known that the resistance of films of both the emeraldine base and 50% protonated emeraldine hydrochloride polymer decrease by a factor of approximately 3 to 4 when exposed to water vapor. The resistance increases only very slowly on removing the water vapor under dynamic vacuum. The polyaniline polymer exhibits conductivities of approximately 1 to 20 Siemens per centimeter (S/cm) when approximately half of its nitrogen atoms are protonated. Electrically conductive polyaniline salts, such as fully protonated emeraldine salt [($-C_6H_4-NH-C_6H_4-NH^+$)$-Cl^-$]$_x$, have high conductivity ($10^{-4}$ to $10^{+2}$ S/cm) and high dielectric constants (20 to 200) and have a dielectric loss tangent of from below $10^{-3}$ to approximately $10^1$. Dielectric loss values are obtained in the prior art by, for example, carbon filled polymers, but these losses are not as large nor as readily controlled as those observed for polyaniline.

While the preparation of polyaniline polymers and the protonated derivatives thereof is known in the art, it is novel to prepare sulfonated polyaniline compositions which are capable of being "self-protonated" or "self-doped". The use of the terms "self-protonated" and "self-doped" herein includes, but is not limited to, the reorganization of hydrogen ions on the polymer i.e., the absence of any counterion not covalently bonded to the polymer chain. For example, self-doping or self-protonation of a polyaniline base polymer leads to a polyaniline salt polymer and a reorganization of the electronic structure which then forms a polaronic metal. The conductivity of such polaronic metal is independent of external protonation.

The present invention is related to the invention disclosed in the parent copending application Ser. No. 07/423,902 filed Oct. 19, 1989 which is expressly incorporated herein by reference. That application discloses, in part, the sulfonation of the emeraldine base form of polyaniline in a solution phase.

SUMMARY OF THE INVENTION

The present invention provides a process for producing a polymeric acid polymer which is capable of protonating or doping itself to form an electrically conducting polymer. The sulfonated polyaniline polymer has faster electronic, electrochemical, chemical, and optical responses and improved solubility than the parent polymer, polyaniline. The solubility of the sulfonated polyaniline polymer is increased greatly due to the presence of the sulfonic group $SO_3H$. The sulfonated polyaniline polymer is easy to dissolve in basic aqueous solutions in which the polyaniline polymer is insoluble. In addition, due to the electron withdrawing effects of the $SO_3H$ group, the sulfonated polyaniline polymer has improved environmental stability over the polyaniline polymer.

The present invention relates to a gas phase process for producing the sulfonated polyaniline which comprises reacting the emeraldine base polyaniline polymer with gaseous $SO_3$.

The gas phase sulfonation process of the present invention eliminates the need for a separation process in order to isolate the sulfonated polyaniline composition from a sulfuric acid solution.

The gas phase sulfonation process also eliminates the need for large quantities of reagent, such as methanol or acetone, to precipitate the sulfonated polyaniline composition from a sulfuric acid solution.

The gas phase sulfonation process is versatile and can be utilized to sulfonate the emeraldine base polyaniline polymer in a variety of forms such as, for example, a powder, stretched free standing films, films adhered to a substrate, and fibers.

Through the use of the gas phase sulfonation process, there is less chance of causing degradation of the emeraldine base polyaniline composition than through the use of a sulfuric acid solution.

Further, the gas phase sulfonation process is simple, fast and uncomplicated, thus providing the industry with an attractive alternative for producing self-protonated conducting sulfonated polyaniline compositions.

DETAILED DESCRIPTION OF THE INVENTION

Figure 1A:
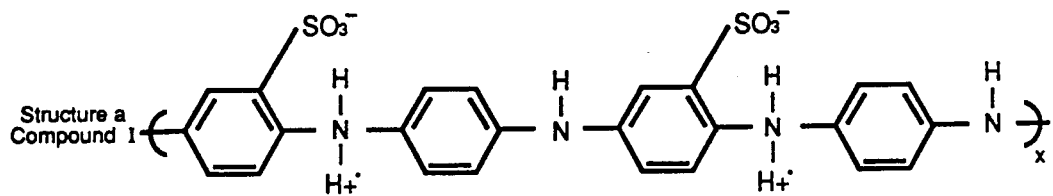
FIG. 1 is a schematic illustration of the different structures of sulfonated polyaniline, (a and b), the ammonia salt (c), and the emeraldine base (d).
Figure 1B:
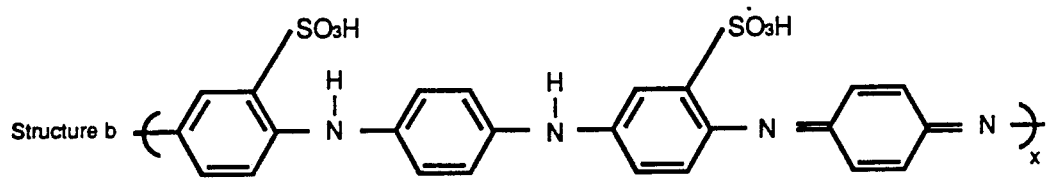
Figure 1C:
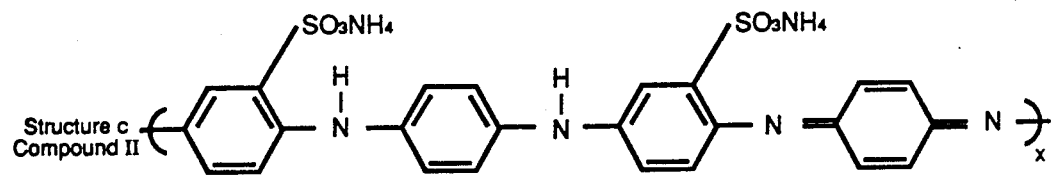
Figure 1D:
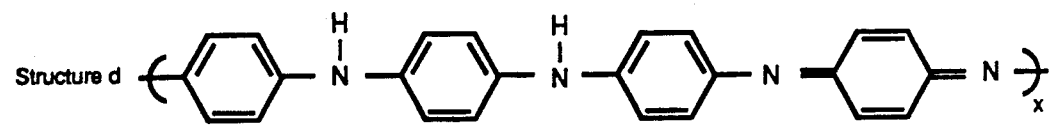

The present invention relates to a process for the preparation of sulfonic acid substituted polyaniline compositions, their derivatives and uses thereof.

The self-protonated sulfonated polyaniline compositions have the formula I

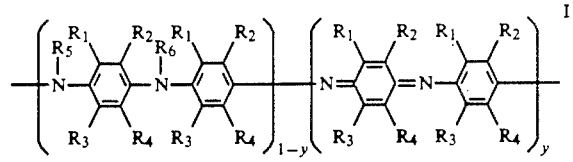

wherein $0 \leq y \leq 1$; $R_1$, $R_2$, $R_3$, $R_4$, $R_5$ and $R_6$ are independently selected from the group consisting of H, $-SO_3^-$, $-SO_3H$, $-R_7SO_3^-$, $-R_7SO_3H$, $-OCH_3$, $-CH_3$, $-C_2H_5$, $-F$, $-Cl$, $-Br$, $-I$, $-NR_{7\,2}$, $-NHCOR_7$, $-OH$, $-O^-$, $-SR_7$, $-OR_7$, $-OCOR_7$, $-NO_2$, $-COOH$, $-COOR_7$, $-COR_7$, $-CHO$ and $-CN$, wherein $R_7$ is a $C_1-C_8$ alkyl, aryl or aralkyl group. For the sake of clarity, the structure shown in formula I is in the non self-protonated form.

The fraction of rings containing at least one $R_1$, $R_2$, $R_3$ or $R_4$ groups being an $-SO_3^-$, $-SO_3H$, $-R_7SO_3^-$ or $-R_7SO_3H$ can be varied from a few percent to one hundred percent. In certain embodiments the percentage ranges from at least approximately 20% up to and including 100%. It is within the contemplated scope of the present invention that the $-R_7SO_3^-$ and $-R_7SO_3H$ substituents can be varied so that the sulfonated polyaniline is soluble in a range of solvents in order to make the sulfonated polyaniline polymer more easily blendable with other polymers and/or more easily cast onto a variety of surfaces.

The solubility of sulfonated polyaniline can be varied by changing the degree of sulfonation (i.e., the sulfonation time and/or temperature in $H_2SO_4(SO_3)$). It is noted that the oxidation state of the polymer (from leucoemeraldine through emeraldine to pernigraniline) and the degree of sulfonation (x) can be independently varied. Here x is the fraction of $C_6$ rings which have an $SO_3^-$ or $SO_3H$ group attached.

When $x=0$, the polymer does not dissolve in either basic or acidic aqueous solutions. Upon increasing the value of x, the polymer becomes soluble in strongly basic, basic, weakly basic and eventually in acidic aqueous solutions. This progressive improvement in solubility implies that the polymer becomes soluble in neutral media, particularly $H_2O$, at the appropriate value of x, yielding a water-soluble conducting polymer. The color of soluble sulfonated polyaniline in acidic solution is green, indicating it is the conducting salt form.

The solubility of polyaniline is increased greatly in basic aqueous solution by the presence of $-SO_3H$ group on the phenyl rings. This is in contrast with polyaniline which when washed with basic solutions, converts to the insoluble base form.

Protonation of the emeraldine base polymer leads to the emeraldine salt polymer and a reorganization of the electronic structure to form a polaronic metal. Since benzenesulfonic acid is a strong acid, about as strong as hydrochloric acid, the sulfonated polyaniline is capable of self-doping. Hence, the conductivity of the sulfonated polyaniline is independent of external protonation.

Being able to dope itself, the sulfonated polyaniline polymer has enhanced optical and electrical response to electrochemical potential as compared with the parent polyaniline polymer. Since the solid-state diffusion of counterions in and out of a polymer during electrochemical processes is often the rate controlling step in the kinetics, it also limits the speed of both optical and electrical response of polymers. In the self-doped conjugated polymer of the present invention, the counterions are not necessary from the medium. The positive charge introduced into the conjugated pi electron system of the backbone of the polymer is compensated by the protons migrating out of the polymer, or vice versa, leaving behind the opposite charged counterion. Being the smallest and most mobile ion, proton hopping mechanisms lead to relatively fast doping kinetics as compared to those counterions migrating in or out of the polymer. As a consequence, it is possible to achieve sufficient speed to be useful for a variety of technological applications.

Without external doping, the sulfonated polyaniline has a conductivity of 0.1 S/cm, which makes the sulfonated polyaniline a self-doped conducting polymer. The results indicate that the amount of charge injected into or ejected out of the sulfonated polyaniline polymer is quite similar to that of polyaniline. Charge transfer doping within a specific potential range in solutions such as 1.0 M HCl and 0.5M $H_2SO_4$ is highly reversible in the air reflecting the environmental stability introduced by the sulfonic acid groups. The inventors present the dependence of positions of redox peaks on different pH values and compare the results with those of sulfonated polyaniline. In contrast with polyaniline, the first redox process depends on pH in the value range of $-0.2$ to about 7 due to the sulfonic acid protons on the sulfonated polyaniline backbones. The second redox process depends on the pH in a manner similar to that of polyaniline.

The chemical synthesis of the sulfonated polyaniline polymers of the present invention is accomplished by reacting polyaniline with concentrated or fuming sulfuric acid, $SO_3$ gas or other sulfonation agents in either air or inert gases. Examples of several of the methods for such syntheses are disclosed below.

Materials-Aniline and other chemicals were obtained from Aldrich and were all reagent grade or better. Hydrochloric acid and ammonium hydroxide were used as received. Different pH buffer solutions were commercially purchased.

Chemical Synthesis I: Emeraldine hydrochloride powder was synthesized from aniline and $(NH_4)S_2O_8$ then converted to analytically pure emeraldine base polyaniline using the method described previously in A. G. MacDiarmid, J. C. Chiang, A. F. Richter, N. L. D. Somasiri and A. J. Epstein in L. Alcacer (ed.) *Conducting Polymers*, D. Reidel Publishing Co., Dordrecht, The Netherlands (1987).

For the sulfonation of polyaniline, 1.5 g polyaniline (dry emeraldine base form) was dissolved into 40 ml fuming sulfuric acid $H_2SO_4(SO_3)$ with constant stirring at room temperature. During the sulfonation period the color of the solution changed from dark purple to dark blue. After approximately 2 hours, the solution was slowly added during about 20 minutes to 200 ml methanol while maintaining the temperature between about 10°-20° C. by an ice bath. A green powder precipitate was formed during the mixing. After the mixing, 100 ml of less polar acetone was added to the solution in order to increase the precipitate. The green powder was then collected on a Buchner funnel using a water aspirator. The precipitate cake was washed portionwise (50 ml/portion) with methanol until the portion of the filtrate showed pH=7 when tested by wet pH paper. The liquid level in the Buchner funnel was constantly adjusted so that it remained above the top of the precipitate. This prevented cracking of the precipitate cake, which would result in inefficient washing of the precipitate cake.

After the above washing, the precipitate remained under suction for approximately 10 minutes. It was then transferred on the filter paper to a vacuum desicator and dried under dynamic vacuum for 24 hours. Elemental analyses, as shown in Table I are consistent with the composition shown in FIG. 1 as structure a, compound I, which is sulfonated, protonated polyaniline in the emeraldine oxidative state. The self-doped polyaniline is readily dissolved in a dilute aqueous base solution to form a homogeneous blue-violet solution. The solubility of compound I in 0.1M $NH_4OH$ and NaOH is about 23 mg/ml.

Chemical Synthesis II: 1.5 g polyaniline (dry emeraldine base form) was dissolved into 40 ml concentrated sulfuric acid $H_2SO_4$, and the temperature slowly raised from the room temperature to 70° C. in water bath in 3 hour period with the constant stirring. The temperature was kept at 70° C. for 15 hours. Then the temperature was raised to 95° C. within 0.5 hour and kept there for 4 hours. The reaction mixture was cooled down to room temperature. The product was very slowly added to $-38°$ C. ice made from 160 ml distilled $H_2O$ in order to precipitate the polymer. The temperature of the solution was not allowed to reach higher than 0° C. during the process. After the temperature of the solution reached room temperature the solution was filtered to obtain a fine powder of sulfonated polyaniline. Large particles were obtained by subsequently heating the room temperature solution up to 70° C. in a two hour period, then cooling to room temperature, and conducting filtration to separate the sulfonated polyaniline from the solution. The sulfonated polyaniline was washed with an excess of $H_2O$ until the filtrate was neutral (as tested by pH paper). Dry sulfonated polyaniline was obtained by pumping under dynamic vacuum at room temperature for 48 hours.

Chemical Synthesis III: From the Chemical Synthesis II described above a copolymer (i.e., the polymer mixture of polyanilines and sulfonated polyaniline) was obtained by partially sulfonating polyaniline. This was done in exactly the same way described in the Chemical Synthesis II except utilizing shorter sulfonation times and/or lower sulfonation temperature.

Chemical Synthesis IV: Another way to prepare the copolymer polyaniline-sulfonated polyaniline was to react 2-aminobenzene-sulfonic acid (2ASA) with oxidizing agent in the presence of aniline. 10 g (0.58 mol) 2ASA and 2 ml (0.02 mol) aniline were dissolved in 500 ml 1M HCl. A prepared solution of 6.609 g (0.029 mol) $(NH_4)_2S_2O_8$ in 200 ml 1M HCl was added dropwise to the monomer solution with vigorous stirring during a period of 10 minutes. After 1.5 hours, the precipitate was collected on a Buchner funnel. The precipitate was washed with 1M HCl until the filtrate was colorless. Then the precipitate was washed by 500 ml $H_2O$. To ensure that the copolymer was in its neutral form, the precipitate was then transferred into a beaker containing 500 ml of $H_2O$ and stirred at room temperature for 4 hours. The mixture was filtered until the pH of the filtrate was 7. The dry copolymer was obtained by pumping under dynamic vacuum at room temperature for 48 hours.

Chemical Synthesis V: The dry emeraldine base form of polyaniline is exposed to $SO_3$ gas for a predetermined length of time and at a predetermined temperature. Gas phase sulfonation of the polyaniline at elevated temperatures decreases the reaction time, while use of reduced temperatures increases the reaction time. At conditions of excess $SO_3$ gas, the gas phase sulfonation can be completed in about 12 hours at room temperature.

Figure 2:
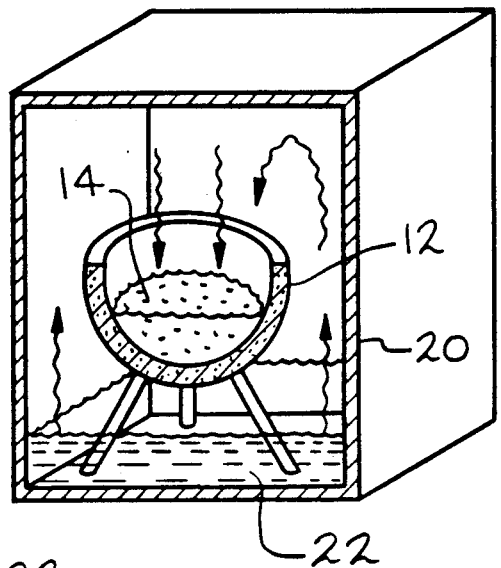
FIG. 2 is a schematic diagram of a method of gas phase sulfonation of a polyaniline composition.

Referring now to FIG. 2, one example of the process of gas phase sulfonation is shown: finely ground dry emeraldine base form of polyaniline powder 10 was placed in a container 12 having an open top 14 and a fine porosity glass frit bottom 16. The container 12 was placed inside, in a spaced apart relationship, a closed container 20, containing fuming sulfuric acid 22 $H_2SO_4(SO_3)$. The $SO_3$ gaseous fumes penetrate through the frit bottom 16 and surround the emeraldine base polymer 10 through the open top 14 of the container 12 so as to come into contact and react with the emeraldine base powders. The reaction time depends upon such factors, as for example, the surface area, amount of powder, and design of reactor. For example, 0.2 g of emeraldine base powder (finely ground) spread over 3 cm diameter frit and exposed to 40 ml of 23% fuming sulfuric acid sulfonated to one $SO_3H$ per two rings in about 8 hours. The resulting powder was fully soluble in 0.1M $NH_4OH$.

Figure 3:
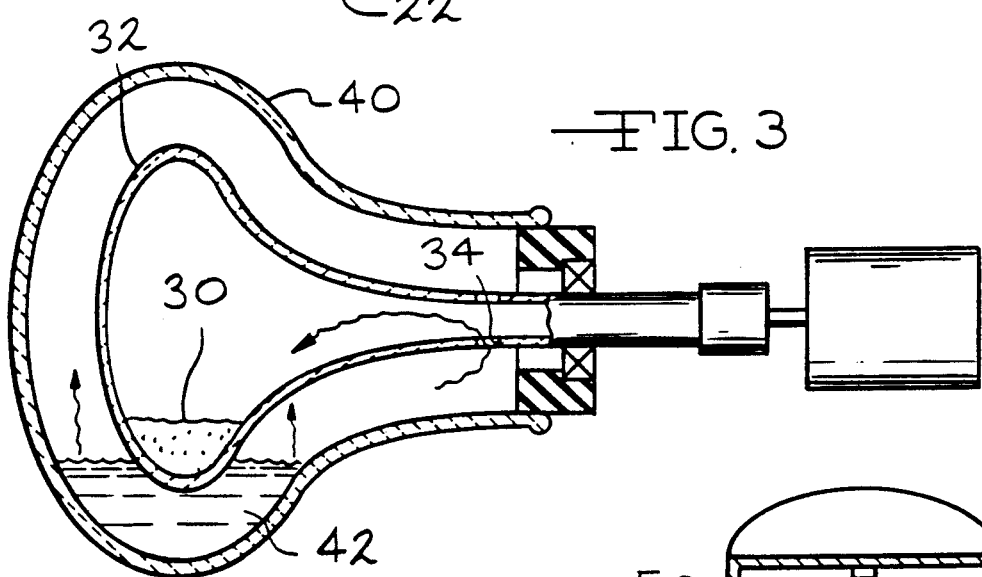
FIG. 3 is a schematic diagram of another method of gas phase sulfonation of a polyaniline composition.

Referring now to FIG. 3, another example of gas phase sulfonation is shown: finely ground dry emeraldine base form of polyaniline powder 30 is placed in a first container or flask 32 having at least one opening 34. The first flask 32 is placed in a spaced apart relationship, within a second container or flask 40 containing fuming sulfuric acid 42 $H_2SO_4(SO_3)$. The first flask 32 is rotated about its longitudinal axis such that the emeraldine base powder is homogeneously exposed to the $SO_3$ gas fumes which enter the first flask 32 through the opening 34. The reaction time for the configuration of FIG. 3 is considerably less than the reaction time achieved by the approaches shown in FIG. 2.

Figure 4:
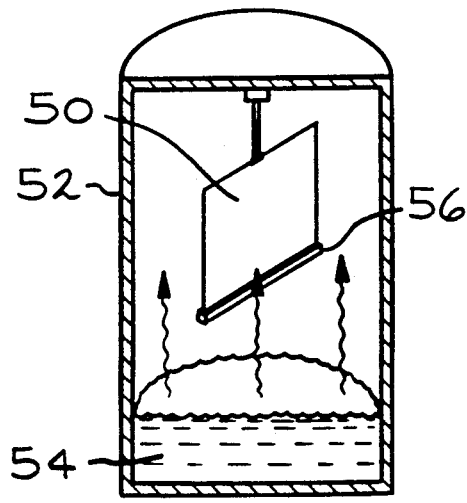
FIG. 4 is a schematic diagram of another method of gas phase sulfonation of a polyaniline composition.

Referring now to FIG. 4, yet another example of gas phase sulfonation is shown: a film of dry emeraldine base formed of polyaniline 50 is suspended in a closed container 52 containing fuming sulfuric acid 54. Since the gas phase sulfonation process tends to soften the emeraldine base film, a weight 56 can be attached to the lower end of the emeraldine base film 50. The weight 56 stretches the film 50, thus providing an oriented sulfonated polyaniline film. The $SO_3$ gas rising from the fuming sulfuric acid penetrates the emeraldine base film. For example, a film of emeraldine base polymer having a thickness of 20 microns, exposed at room temperature to fumes from 40 ml of 23% fuming sulfuric acid, sulfonated to one $SO_3H$ per 2 rings in about 2 hours. The resulting film was fully soluble in 0.1M $NH_4OH$.

Films comprising the polyaniline emeraldine base polymer, already oriented and either free standing or adhered to a substrate, and fibers comprising the emeraldine base polyaniline can be sulfonated according to the $SO_3$ gas phase sulfonation method of the present invention.

It is also within the contemplated scope of the present invention that any of the desired forms of the emeraldine base formed of polyaniline can be sulfonated by exposure to $SO_3$ gas without the presence of sulfuric acid, $H_2SO_4$.

Conductivities of the compound I was measured on compressed pellets of the powder by using four point probe techniques with a Keithley 220 constant current source and Keithley 181 voltmeter.

The conductivity of unoriented sulfonated polyaniline composition made using the gas phase sulfonation process is in the range of about 0.03 S/cm. to about 0.1 S/cm.

Elemental analyses and conductivity studies are consistent with the sulfonation of emeraldine base with fuming sulfuric acid proceeding to give a self-doped, sulfonated, protonated forms of the emeraldine oxidative state of polyaniline, the compound I which has a conductivity of $\sim 0.1$ S/cm. This polymer can be regarded as being formed by the hypothetically initial formation of the strong acid, shown as structure b in FIG. 1, which then immediately protonates the imine nitrogen atoms to give the conducting polymer in an entirely analogous manner to strong acids such as HCl. Treatment of the structure b compound with an aqueous (ammonium) base yields the sulfonated, nonprotonated insulating ammonium salt forms analogous to emeraldine base, viz, the structure c compound shown in FIG. 1.

The conductivity of the compound I ($\sigma \sim 0.1$ S/cm) is similar to that of emeraldine hydrochloride measured under the same experimental conditions ($\sigma \sim 1$-5 S/cm; laboratory air), but lower than that $\sigma \sim 18$ S/cm of high molecular weight emeraldine hydrochloride. The self-doped sulfonated polyaniline with emeraldine oxidative state differs dramatically from nonexternally doped polyaniline in conductivity. Since sulfonic acid is a strong acid, approximately as strong as hydrochloric acid, the compound I is capable of doping itself. The dark green self-doped compound I had a room temperature conductivity of about 0.1 S/cm in contrast to the purple color and insulating behavior of polyaniline emeraldine base form. However, the conductivity of compound I is lower than that of emeraldine hydrochloride pressed pellets.

The present invention thus discloses that sulfonated polyaniline can be synthesized chemically. Elemental analyses and conductivity data suggest that, depending on the sulfonation times and temperatures, the number of $-SO_3H$ groups per phenyl ring varied from 0.2 to 1.0. The conductivity is independent of pH in the range of pH values smaller than or equal to 7.

The present invention provides an uncomplicated and less time consuming method for producing sulfonated polyaniline composition such that the sulfonated polyaniline compositions and their derivatives are extremely useful in various electronic, electrochemical, chemical, and optical applications. The sulfonated polyaniline compositions have a more rapid electrochemical response than polyaniline. The ability of the sulfonated polyaniline compositions to have a fast switching speed between a conducting and a nonconducting state with good reversibility makes such compositions attractive polymers to use for a variety of electrochemical applications.

Further, the solubility and the electrical conductivity of the sulfonated polyaniline compositions makes such compositions especially useful in still other applications. In addition, the process of the present invention can be used to sulfonate previously oriented films, fibers, and coatings produce self-protonated sulfonated polyaniline materials having high conductivity, high mechanical strength and anisotropy.

The sulfonated polyaniline compositions can be coated by a variety of techniques onto substrates of choice. The sulfonated polyaniline polymers can be applied to substrates according to the present invention by spray coating, dip coating, spin casting, transfer roll coating, brush-on coating, and the like. The sulfonated polyaniline polymers can also be electrochemically deposited onto conductive substrates by known electrochemical deposition techniques.

Sulfonated polyaniline can also be entrained within a matrix of, or copolymerized with, other polymer materials to thereby produce a blend or a composite. Thus, sulfonated polyaniline could be dispersed in, for example, polyethylene, polyimide, cellulose nitrate, and the like, and also can be coated onto fibrous materials. The sulfonated polyaniline compositions can be used with other insulating polymers to form conductive thermosetting resins, epoxies, and thermoplastics, and reacted with bismaleimides for use in forming, for example, such devices as conductive seals, joints and moldings. In addition, derivatization of the sulfonated polyaniline compositions can enhance compatibility and processability of the polymer with other polymers.

In addition, the sulfonated polyaniline compositions can be cast as thin films from a solvent solution, and the solvent evaporated to produce free standing films. The sulfonated polyaniline films can be stacked as a composite with other sulfonated polyaniline films, with films of sulfonated polyaniline copolymerized with another polymer, or with non-polyaniline polymers and/or copolymers. Depending on the desired type and degree of substitution of the sulfonated polyaniline with various crosslinkable functional moieties, the films produced can be cured in deeper sections, that is, thicker films or articles can also be produced by known polymer preparation techniques.

The sulfonated polyaniline compositions and derivatives thereof have, or can be designed to have, desired processability in terms of, for example, viscosity, flexural strengths, solubility, adhesion to substrates, crosslinking, melting point, weight, adaptability to filler loading and the like. This is achieved by varying as desired the degree of self-protonation, the state of oxidation, and the type and degree of substituents on the polymer. Certain substituents may be preferred for the facilitation of desired processing parameters, such as increasing or decreasing solubility, altering extrusion parameters (rheology), achieving a specific viscosity, and the like. Derivatization is also useful for achieving compatibility with a copolymer, facilitating the tunability of the sulfonated polyaniline composition for non-linear optics applications, and for specific wavelength absorption, such as microwave attenuation or a particular photoresponse.

While the invention has been disclosed in this patent application by reference to the details of preferred embodiments and examples of the invention, it is to be understood that this disclosure is intended in an illustrative rather than in a limiting sense, as it is contemplated that modifications will readily occur to those skilled in the art, within the spirit of the invention and the scope of the claims which follow.

TABLE 1:

| | Elemental Analyses[a] of Chemically Synthesized Sulfonic Ring-Substituted Polyaniline | | | | | | |
|---|---|---|---|---|---|---|---|
| sample | C | H | N | S | O[b] | Total | Formula |
| PAN[c] (cal.) | 79.54 | 5.00 | 15.46 | — | — | 100 | $C_{12}H_9N$ |
| PAN (found) | 79.14 | 4.96 | 15.16 | — | — | 99.26 | |
| SPAN[c] (cal.) | 51.67 | 3.96 | 10.04 | 11.49 | 22.84 | 100.00 | $C_{12}H_9N_2SO_3(H_2O)_{0.98}$ |
| SPAN (found) | 52.12 | 3.98 | 10.13 | 11.18 | 22.59 | 100.00 | |

[a]C, H, and N analyses were performed by Dr. R. Kohli at U. of Pennsylvania, S analysis was carried out by M-H-W Laboratories, Phoenix, AZ.
[b]Oxygen content is by difference.
[c]PAN refers to polyaniline and SPAN to ring-sulfonated polyaniline.

We claim:
1. A process for producing a sulfonated polyaniline composition having a chemical composition of formula I

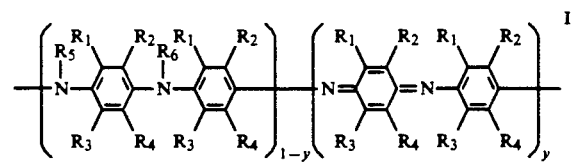

wherein $0 \leq y \leq 1$, $R_1$, $R_2$, $R_3$, $R_4$, $R_5$ and $R_6$ are independently selected from the group consisting of H, $SO_3^-$, $-SO_3H$, $-R_7SO_3^-$, $-R_7SO_3H$, $-OCH_3$, $-CH_3$, $-C_2H_5$, $-F$, $-Cl$, $-Br$, $-I$, $-NR_{7\,2}$, $-NHCOR_7$, $-OH$, $-O^-$, $-SR_7$, $-OR_7$, $-OCOR_7$, $-NO_2$, $-COOH$, $-COOR_7$, $-COR_7$, $-CHO$ and $-CN$, wherein $R_7$ is a $C_1-C_8$ alkyl, aryl or aralkyl group, and wherein the fraction of rings containing at least one $R_1$, $R_2$, $R_3$ or $R_4$ group being an $-SO_3^-$, $-SO_3H$, $-R_7SO_3^-$, or $-R_7SO_3H$ varies from approximately 20 percent to one hundred percent, comprising reacting the polyaniline polymer or substituted polyaniline polymer and $SO_3$ gas.

2. The process according to claim 1 in which the reaction is conducted at a temperature range of between about room temperature and 100° C.

3. The process according to claim 1 in which the reaction is carried out in air or inert atmosphere.

4. The process according to claim 1 in which the polyaniline polymer or substituted polyaniline polymer has a predetermined chain length which is not reduced in length during the reaction.

5. The process according to claim 1 in which a copolymer of polyaniline and sulfonated polyaniline is obtained by partially sulfonating the polyaniline polymer.

6. The process according to claim 5 in which the partial sulfonation of the polyaniline polymer comprises shortening sulfonation times and/or lowering sulfonation temperatures.

7. A sulfonated polyaniline composition of formula I, produced according to the process of claim 1.

8. The composition of claim 7, wherein the composition is a sulfonated polyaniline film.

9. The composition of claim 7, wherein the composition is an oriented sulfonated polyaniline film.

10. The composition of claim 7, wherein the composition is a sulfonated polyaniline film adhered to a substrate.

11. The composition of claim 7, wherein the composition is a sulfonated polyaniline fiber.

12. The composition of claim 7, wherein the composition is a polyaniline powder.

* * * * *